Jan. 5, 1965     R. W. MOORE     3,163,966
VIBRATORY FINISHING
Filed Jan. 23, 1962     6 Sheets-Sheet 1
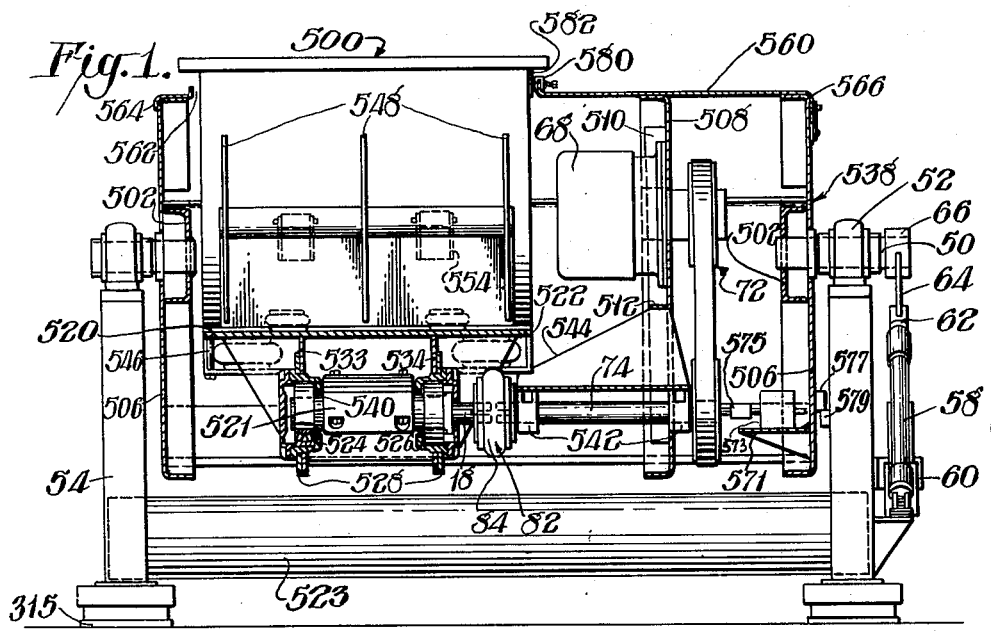
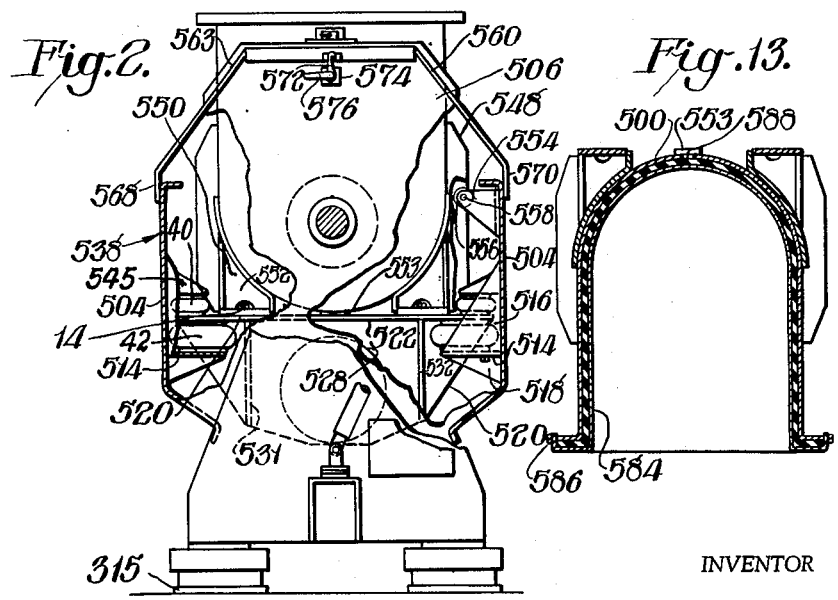
INVENTOR
Ralph W. Moore
BY Connolly and Hutz
ATTORNEY

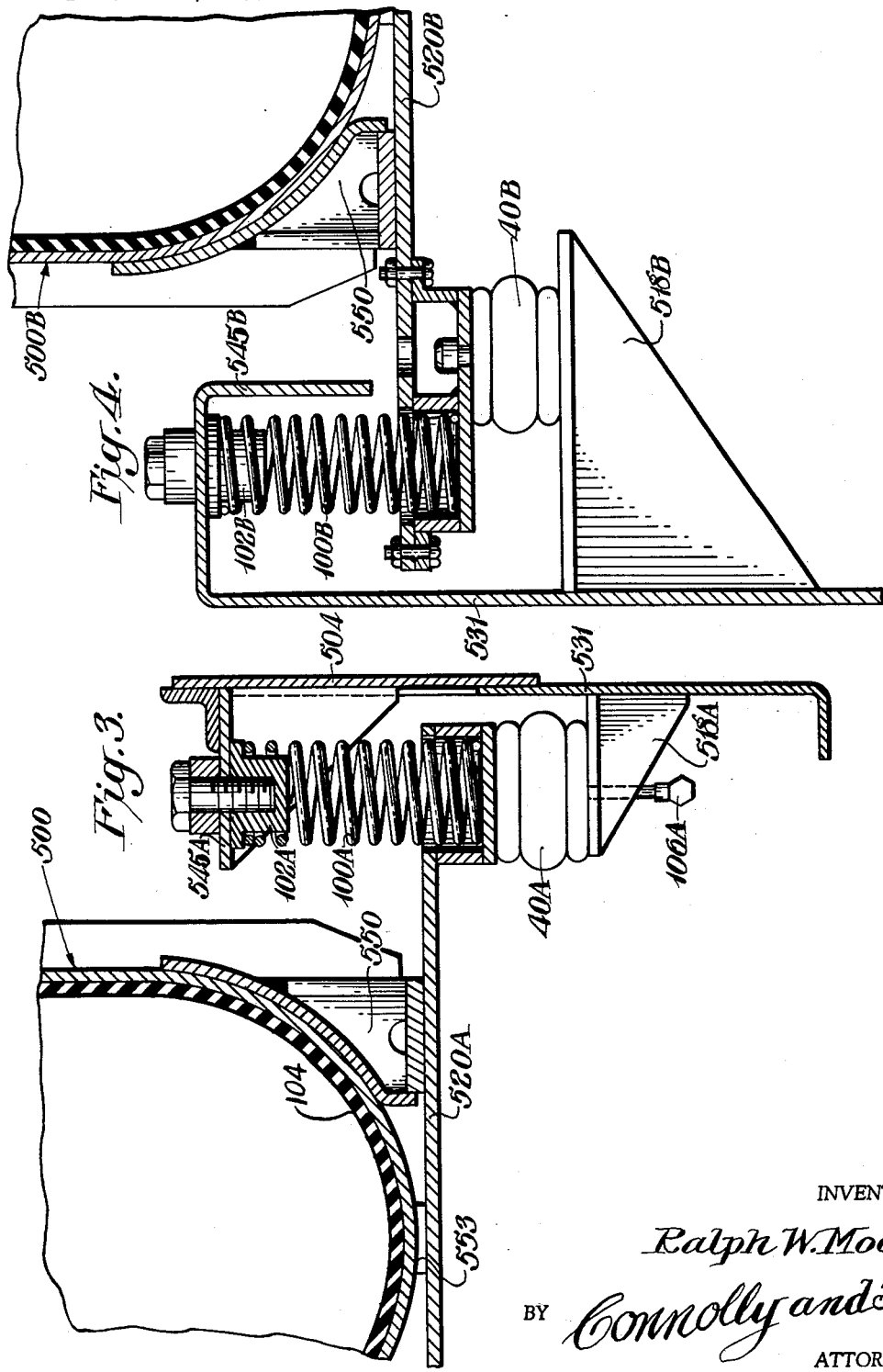

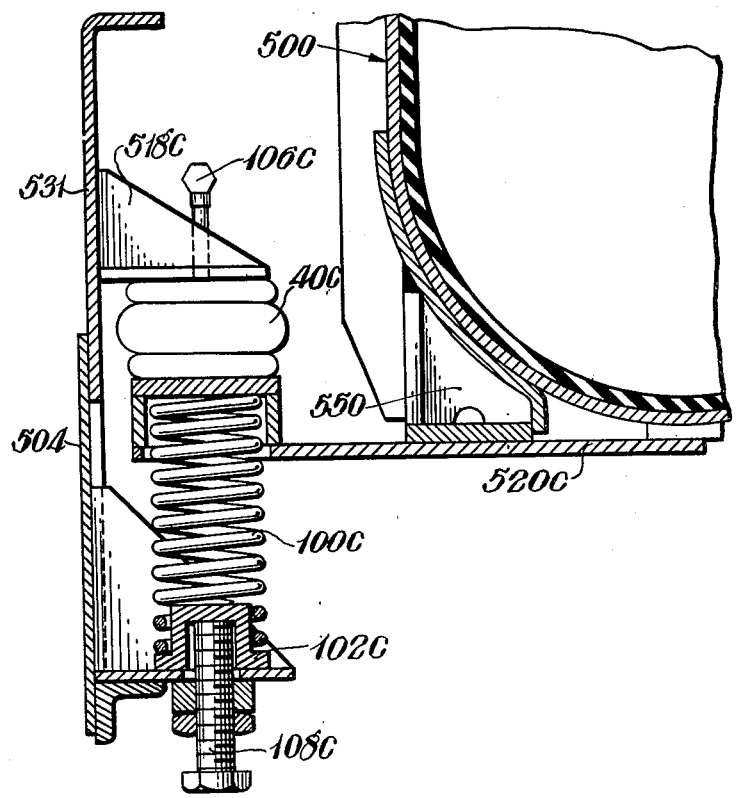

Jan. 5, 1965
R. W. MOORE
3,163,966
VIBRATORY FINISHING
Filed Jan. 23, 1962
6 Sheets-Sheet 4
Fig. 5.A
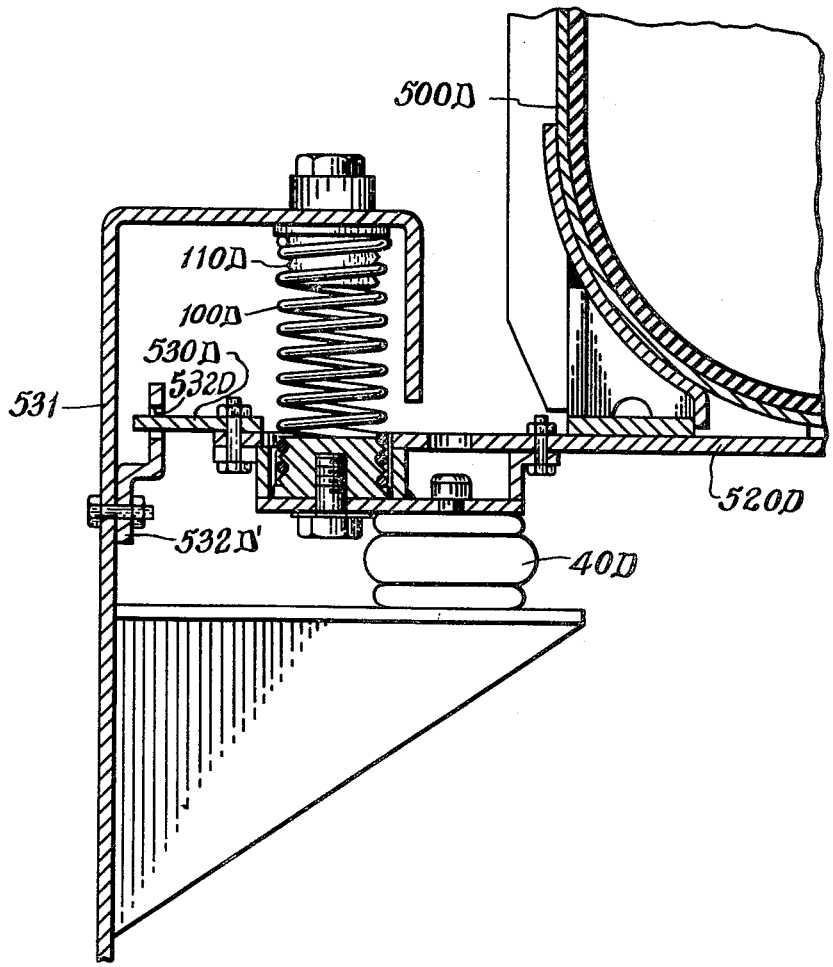
INVENTOR
Ralph W. Moore
BY Connolly and Hutz
ATTORNEYS Jan. 5, 1965 R. W. MOORE 3,163,966
VIBRATORY FINISHING
Filed Jan. 23, 1962 6 Sheets-Sheet 5
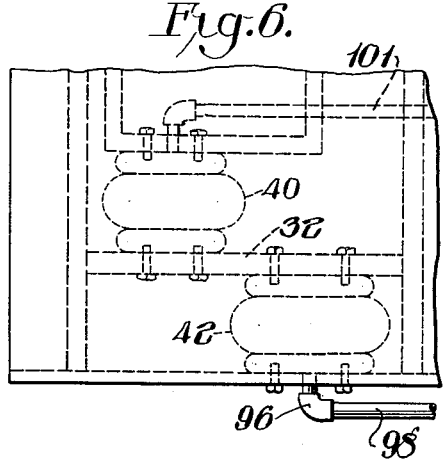
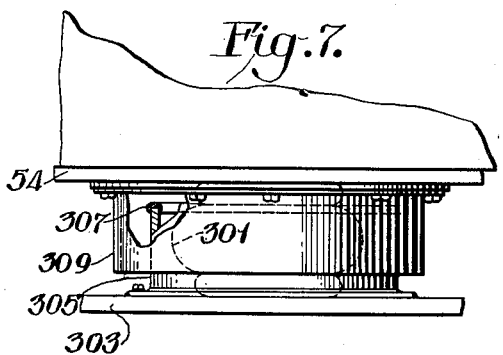
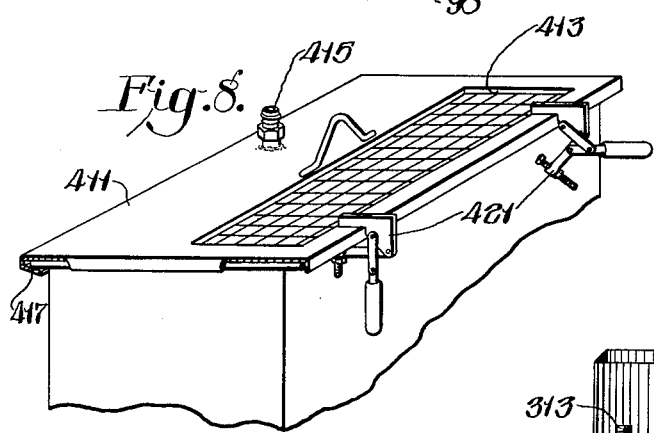
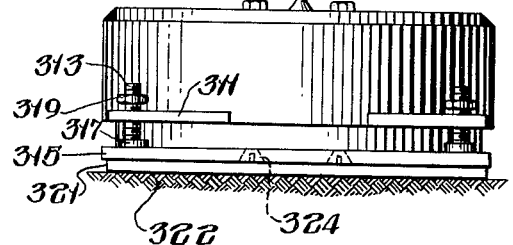
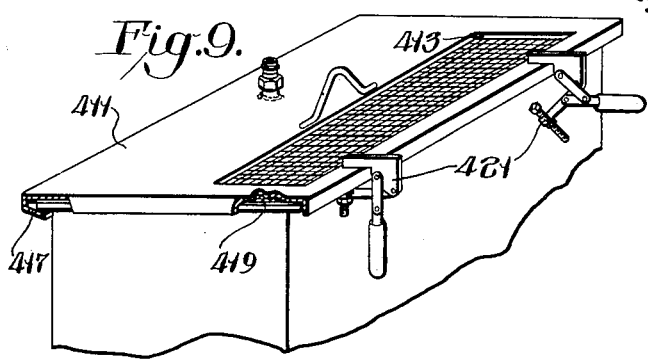
INVENTOR
Ralph W. Moore
BY Connolly and Hutz
ATTORNEYS Jan. 5, 1965 R. W. MOORE 3,163,966
VIBRATORY FINISHING
Filed Jan. 23, 1962 6 Sheets-Sheet 6

INVENTOR
Ralph W. Moore
BY Connolly and Hutz
ATTORNEYS

United States Patent Office 3,163,966
Patented Jan. 5, 1965

3,163,966
VIBRATORY FINISHING
Ralph W. Moore, Hagerstown, Md., assignor, by mesne assignments, to The Pangborn Corporation, Hagerstown, Md., a corporation of Delaware
Filed Jan. 23, 1962, Ser. No. 168,146
Claims priority, application Great Britain, Jan. 23, 1961, 2,575/61
3 Claims. (Cl. 51—163)

This invention relates to vibratory finishing, more particularly the type of vibratory or gyratory finishing suitable for treatment of work pieces of metal or the like for the purpose of duburring, descaling, cleaning, polishing, burnishing, rounding corners and edges, etc.

This application is a continuation-in-part of my co-pending application Serial No. 4,908 filed on January 27, 1960, and now issued as Patent No. 3,063,207, dated November 13, 1962.

The use of vibration or gyration for the above purpose has been known for some time. However, machines built for these purposes have been relatively complicated and cumbersome as well as somewhat awkward to use when adapted for variable loading.

Among the objects of the present invention is the provision of novel equipment and techniques for the above type of finishing that simplifies the handling of widely varying loads and reduces the cost of such treatment.

The above as well as additional objects of the present invention will be more clearly understood from the following description of several of its exemplifications, reference being made to the accompanying drawings wherein:

FIG. 1 is a front view partially in section of the apparatus;

FIG. 2 is a side view partially in section of the apparatus of FIG. 1;

FIG. 3 is a detail on an enlarged scale and partially in section of a modification of one of the support elements of the apparatus of FIGS. 1 and 2;

FIG. 4 is a view similar to FIG. 3 shown with the support elements in offset position;

FIG. 5 is a detail on an enlarged scale and partially in section of a further modification of one of the support elements;

FIG. 5a is a detail on an enlarged scale and partially in section of still a further support arrangement for a vibratory apparatus.

FIG. 6 is a detail of a modified gyration support for the apparatus of FIGS. 1 and 2;

FIG. 7 is another detail illustrating an optional base construction of the apparatus of the present invention;

FIGS. 8 and 9 are perspectives showing suitable cover arrangements for the apparatus of FIG. 1;

FIG. 12 is a view similar to FIG. 7 of another optional base construction; and

FIG. 13 shows an arrangement for the construction of the apparatus of the present invention.

Figure 10:
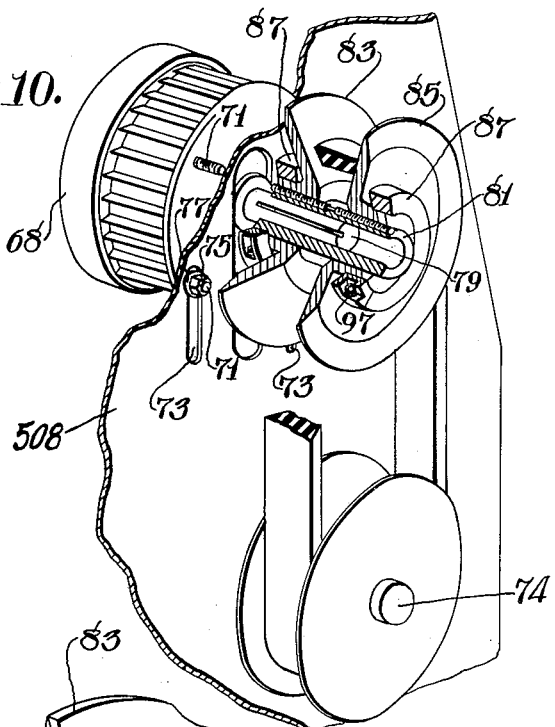
FIGS. 10 and 11 are enlarged perspectives in detail and partially sectioned of a portion of a drive connection for the apparatus of the present invention.

According to the present invention the vibratory finishing apparatus has a container for the work articles, and vibrating structure connected to gyrate the container. The container is supported by air cushions as in the above-identified parent application. These air cushions are preferably arranged effectively below the container, preferably with four or more such cushions arranged in symmetrical spaced relationship, although fewer can be used if desired. It is found particularly helpful, however, to have at each supported location an air cushion effectively below the container and at least one pre-loading device such as another air cushion or spring effectively above the container, since this is found to provide better control over the operation of the apparatus and to increase its loading range. A cushion is effectively below the container when the container or a supporting member secured to the container rests on top of the cushion. Conversely a cushion or spring is effectively above the container when the container or a supporting member secured to the container depends from the cushion.

Each air cushion can be in the very simple form of a pair of substantially rigid open cups with their open sides facing each other and held apart by a resilient hollow air-filled tube having open ends secured in the respective cups. It is also advantageous to have the air cushions connected to a source of air under variable pressure so that the pressure in the air cushions can be altered to thereby vary the resiliency that the cushions provide. All the lower air cushions can, for example be connected to one source of air, and an upper set of air cushions to another source of air so that the support of each location can be changed through an extremely wide range of resiliency and stiffness. This controlled variation in resiliency or in support is also accomplished by employing a pre-loading spring device such as a coil spring in general opposition to the lower supporting cushion.

The support for the container conveniently carries the vibrating drive structure and can have a base provided with an additional set of cushions to base the support on the floor or the like.

Referring now to the drawings, FIGS. 1 and 2 show a vibratory treatment apparatus having a generally trough-shaped container 500 held on a table 520 as by means of bolts 14 through sheet 522. Feet 550 secured as by welding to the underside of the container provide convenient flat surfaces at their lower portions for engagement against the table 520. The table is vibrated by means of a shaft 18 having an eccentric weight 521 secured thereto and journalled between bearings 524 and 526 rigidly attached to the table as by means of the plates 533 and 534 welded to the underside of the table. Skirts 531 and 532 depending from the side edge of the table and also fastened to the table by welding, help to greatly increase the rigidity of the connection to the vibrating drive. The eccentric weight can be replaceably attached to shaft 18 as by bolts so that different weights can be used for modifying the magnitude and frequency of vibration.

The air cushion support is shown as provided by upper and lower flanges 518 and 544 secured against the outer surfaces of the sheets 504 and carrying horizontally extending shelves 514 that are received between the flanges of supporting sheets 504 that encircles the table. Sheet 522 of the table is joined to the flange 518 below it by an air cushion 42, and is also similarly joined by an air cushion 40 to the flange above it.

FIGS. 1 and 2 employ a tilt framework 538 made of a pair of traverse channel beams secured to and connected by side sheets 504. These side sheets have flanged longitudinal edges for added stiffness and are also bent inwardly near their lower portion to further increase their rigidity and protect the interior somewhat against splashing from the floor. The outer faces of the beams 502 are covered by end panels 506 which extend over the entire space between the end sheets and also rises to a height well above them. The margins of the end panels are also flanged for strength. A similar intermediate panel 508 is secured between the side sheets and is reinforced as by welded-on angles 510 and a bar 512 to support the driving motor 68 and jackshaft 74.

To each side sheet is secured a pair of shelves 514 on which are mounted the lower air cushion supports for the work container. The shelves extend short distances longitudinally of the apparatus and then terminate in vertically disposed flanges 516, 518. The flanges 516 at the outer ends of the shelves extend upwardly while the flanges 518 at the adjacent ends of shelves extend downwardly. All flanges as well as the bodies of the shelves are welded to the side sheets 504.

Upon the lower air cushions, the work table 520 rests. The top of the table is a flat sheet 522 and it is rigidified by a grid of reinforcing plates 531, 532, 533 and 534 welded to its lower surface. Plates 533, 534 extend transversely and have central passageways in which are received the bearings 524, 526 of the vibrator shaft. Around these passageways strengthening rings 528 can be secured. The bearings are preferably encased as shown with leak-tight covers sealed against the vibrator shaft with wiper-type seals as at 540. The bearings are also supplied with lubricant as by a conduit connected to a convenient reservoir which can be observed readily to make sure a lubricant supply is available and also that lubricant is being consumed. A check of the bearing temperatures is also desrable and this can be provided by a thermocouple also connected to a convenient measurement location.

The jackshaft 74 is secured by bearings 542 fastened to the underside of a channel-shaped mounting plate 544 welded to the intermediate panel 508 and projecting through a suitable passageway in that panel. Where upper air cushion supports are used for the table they can be appreciably smaller than the lower air cushion and can be secured to the top of the table offset from the lower cushions in a longitudinal direction such that the upper cushions are closer to each other than the lower cushions, as shown in FIG. 1. Removable brackets 545 can be bolted to the side sheets 504 to hold down the upper cushions and permit them to be readily removed, as for example when the table 520 is to be replaced. For shipping purposes bolts 546 can be fitted through holes in the air cushion shelves 514 and threaded into the table, with spacers slipped between the shelves and the table to clamp the table against movement. Two such bolt clamps on diagonal corners of the table are adequate for this purpose.

The work container of FIGS. 1 and 2 has strengthening ribs 548 welded to its external side surfaces and also has its feet 550 strengthened by gusset plates 552 welded over the open ends of the feet, preferably in the plane of the ribs 548. A further set of aligning bosses 553 can be formed along the longitudinal center of the container bottom, and they can be provided with aligning pin openings that match up with aligning openings in the table top.

The framework can merely be a generally rectangular combination of channels carrying a pair of opposed reinforced sheets to which flanges are welded, which may in turn, be pivotally held by stub shafts 50 projected from opposite ends of the framework. Journals 52 carried by piers 54 receive the stub shafts and permit the entire framework, including the table and container, to pivot as for the purpose of unloading work articles from the container. The piers 54 can be directly secured to a floor such as a rigid concrete slab, and can also be tied together by a brace 523, in the form of a tube. Either or both of the piers can also be used as an anchoring for a tilting mechanism which in the illustrated embodiment is a pneumatic cylinder 58 pivoted directly at its lower end to a bracket 60 held by the piers, and having a movable piston rod 62 connected to jackshaft 50 by a bellcrank 64 which can be secured to a collar 66 keyed to the shaft. This tilting can also be hydraulically, mechanically or electrically actuated, if desired.

It is helpful not to rely on the air cushions holding the work container when it is tilted to unloading position. As illustrated in FIGS. 1 and 2, mounting clips 554 are affixed to the side sheets and each has two arms holding a resilient tube 556 so that it is only slightly spaced from the side of the work container and does not interfere with its gyration. Pins 558 extending through the arms support the tubes 556, and the tubes can be made of rubber, either natural or synthetic, as well as of resilient plastic such as nylon. Two such tubes will adequately support the work container when the tilt frame is tilted. The air cushions permit the tilted container to lean against the supporting tubes without unduly stressing the cushions. At the same time the supporting tubes do not interfere with the simple lifting out of the work container when it is to be replaced.

In order to protect the apparatus against spillage around the top of the container, a cover 560 is fitted over the entire top of the tilt frame. The cover has a cut-out opening 562 through which the work container projects and this opening is shown as smaller than the area covered by the lip of the work container so that the lip overhangs the cover around its entre periphery. Turned-up flange 563 around the entire opening further assures that anything dropping on the cover will not be in a position to run into the interior of the tilt frame. Turned-down margins 564, 566, 568, 570 on the cover fit over the corresponding margins of the tilt frame and the cover can be conveniently secured in a readily removable fashion as by means of a hook 572 pivoted to panel 506 at 574 and provided with an operating handle 576. With this arrangement the entire equipment can be hosed down very conveniently and thereby kept very clean.

The cover can also be used as a height indicator for the work container. Adjustable pointer 580 can be secured to cover flange 563 for this purpose and can cooperate with a scale 582 fixed to the adjacent side of the work container. For the longest life of the flexible coupling between the jackshaft and the vibrating shaft, these should be aligned as closely as possible and variations in loading of the work container as well as pressure in the cushion supports, will change the vertical position of the vibrating shaft. The indicator will serve as a convenient guide for the purpose of adjusting the height of that shaft so as to match the position of the jackshaft. The adjustment can also be made automatic as by having a combination cushion inflating valve and cushion deflating valve connected to respond to vertical movement between the work container or table, and the cover or other convenient portion of the tilt frame. The height-sensing device can merely be a pair of electrical switches positioned one above and one below the margin of the table in such a manner that upward movement of the table closes the upper switch and downward movement of the table closes the lower switch. The switches can in turn be connected to operate the valves so that upward movement of the table will cause the lower cushions to deflate and downward movement of the table will cause them to inflate. Alternatively the height control can be applied to the upper cushions or to both the upper and lower cushions.

A feature of the construction of FIGS. 1 and 2 is the flat top character of its vibrating table. With such an arrangement the work container can be removed and replaced by any other type of equipment that is desired to be vibrated. Also a perfectly flat top is a simple matter to machine with high accuracy so that one container can be replaced by another without any special fitting required.

The resilient liner for the container can be formed in place as by vulcanizing rubber in situ. FIG. 13 shows such an arrangement in which the work container 500 is held up-side-down over an internal mold 584 as by means of bolts 586 passing through openings around the periphery of the mold and threaded into the edge of the container lip. An opening 588 in the bottom of the container is thereby held up and through it can be introduced the vulcanizing mixture in fluid form. Additional openings can also be provided to facilitate the filling. Inasmuch as rubber will vulcanize better to certain surfaces such as brass, the inside surface of the container can be plated with a thin layer of brass. On the other hand, the surface of the mold is preferably coated with a thin layer of a mold release such as silicone oils.

Instead of rubber, plastics such as polyethylene, polyvinylchloride, polyurethanes and epoxy resins, can be used. These can be plasticized or unplasticized. The absence of plasticizer makes the plastics somewhat more abrasion-resistant but on the other hand, the presence of plasticizer makes them somewhat more resilient.

The molding operation can also be carried out with the container in the right-side-up position, in which event no opening is needed in the bottom of the container and the openings can then be merely provided at the top of the internal mold. The internal mold can also be made in detachable sections so as to render it easier to remove when the molding operation is completed. Instead of molding the container lining in place in the container, it can also be separately molded between removable mold shells and then cemented or vulcanized in the container. With such an arrangement the apparatus of the present invention need not have a removable container. Instead, the container can be made integral with the table.

The apparatus of FIG. 1 has a vibration frequency measuring device shown as a tachometer generator 573 held on a shelf 571 mounted against the inner surface of panel 506. This generator has a shaft connected as by a simple coupling such as a short length of rubber or resilient plastic tubing 575, to a stub shaft extending from the jackshaft pulley. A conductor cable supplies the output of the tachometer generator to a conveniently located meter on which the output is read on an indicator scale. Other systems can also be used for measuring the rotational speed of the vibrating shaft or can even measure the vibration with a series of reeds mounted for free vibration with the individual reeds having natural periods of vibration adjusted to be at graded intervals over the desired operating range. The reed that shows the strongest vibration when the assembly of reeds is mounted anywhere on the apparatus, indicates the frequency at which the apparatus is operating.

The equipment can also be provided with a safeguard against difficulties that could result from an attempt to operate the vibrating drive when the container is tilted toward unloading position. For this purpose FIG. 1 shows a block 577 secured to the outer face of panel 506 and a cooperating switch 579 on the adjacent supporting pier. These two components are so located that when the container is upright in its operating position the block trips the switch 579 closed, thereby establishing an electrical circuit used in energizing the vibrating drive. In all other positions of the container the block is disengaged from the switch so that vibration cannot be carried out.

The air cushions of the present invention can be constructed in different ways. They can for example be in the form of pneumatic cylinders with movable pistons as in the tilt cylinders referred to above. Such an air cushion has practically no resilient structural elements. The air cushions can also be of all-resilient construction, as by making them of hollow balls of resilient material such as rubber or plastic, and mounting the balls between spherical sockets on the table and tilt frame anchorages. Balls of this type can be cemented or vulcanized in their sockets, or they can be fastened there by bolts extending through the wall of the ball to its interior where they can be threaded into inserts. The air cushions can also have combinations of resilient and non-resilient elements in forms other than those illustrated, but the illustrated construction is preferred because it is simple to manufacture, assemble, use, and maintain.

The air cushions can also be used to suspend the container. By having such cushions effectively above the container, and no supports effectively below the container, the container is suspended in such a way as to gyrate effectively when actuated by any of the vibrating drives referred to above. In this type of combination the ball type cushion is very suitable inasmuch as it easily withstands the tensions developed by the suspended load. Pneumatic cylinders connected between the container and a support are also suitable for such suspended service, particularly when the connections are ball-and-socket joints that allow practically unrestrained gyration.

According to another aspect of the present invention, air cushions can be used in conjunction with conventional spring supports. By way of example, a container supported on the usual combination of coil and leaf spring mounts, can have a set of air cushions effectively above the container and holding it down with a controllable force. Adjusting the pressure in the cushions can then vary the downward force and thereby adjust the height of the container. This will simplify the construction as well as prolong the life of a flexible drive connection or the like.

Driving of shaft 18 to cause gyration of the container can be effected as by means of an electric motor carried by the table, the framework, or any other convenient manner. One highly effective arrangement which reduces the number of components as well as the total mass of the vibratory members is to mount such a motor on the tilting framework. In FIG. 1 such a motor is shown at 68 carried by a panel 508 depending from the framework alongside the table 520. A drive connection such as a variable ratio pulley combination such as shown in FIG. 10 connects the motor with a jackshaft 74 journalled in bearings 542 held on a shelf 544. The jackshaft is in turn coupled to the vibrating shaft 18 by means of a flexible drive coupling 82 as shown having an annularly positioned flexible trough-shaped member 84 clamped between drive discs, keyed to shafts 74 and 18.

The air cushions can be of relatively simple construction such as indicated in copending U.S. application Serial No. 4,908, filed January 27, 1960, having an upper cup and a lower cup of rigid material such as metal, with a flexible open end tube of a material such as rubber or rubber impregnated fabric, connecting them together, the respective ends of the tube being secured in the individual cups. To facilitate this securing the lips of the cups can be turned in, and the ends of the tube molded with an outward flare that mates with the turned-in lips. These tube ends can also be provided with a beading of metal or the like to more securely hold them in place. The central portions of the tube can also be molded with at least a small enlargement so as to assure proper positioning when the cushions are deflated. The cups can also be equipped with a suitable fitting 96 such as shown in FIG. 6 to provide a connection to the interior of the cushion and receiving an air line such as conduit 98.

A single main air supply can, for example, be conveniently mounted on the piers 54 and connected by separate adjustable pressure reducing valves to the lines 98, 101. The same air supply can also be used to operate tilting cylinder 58.

The tilting of the container can be arranged to take place in either direction around the framework pivots 50. In fact, dual tilting can also be provided so that the container can be tilted in one direction as for dumping the work, and in the opposite direction for other purposes such as rinsing the work or the container. The container 500 is shown as provided with an internal liner 104 (FIG. 3) of a resilient material such as natural or synthetic rubber which can be vulcanized in place.

The electric motor 68 is illustrated in FIGS. 1 and 10 as of the "pancake" type so as to enable more compact positioning of the various parts within the framework and also reduce the size of the framework. Adjustment for pulley tension is conveniently arranged by having the motor support slidably mounted for vertical movement on the panel 508.

Jackshaft 74 can also be adjustably positioned vertically so as to stay within the operating tolerances of the coupling 82 insofar as any offset of the jackshaft from the vibration shaft 18 is concerned. The air cushioning is arranged to compensate for changes in weight of container contents, and thereby keep vibrating shaft 18 at a height well within the limits of the drive coupling. In fact, the air cushions can be made to exactly compensate for changes in container loading.

The apparatus illustrated in FIGS. 1 and 2 is used by loading it with the work pieces as well as any other materials that help in the vibratory treatment. These other materials are generally the same as those used in the well-known barrel finishing of work pieces where the work is tumbled in a revolving barrel rather than vibrated or gyrated. Such additional materials include abrasive objects made of ceramic or metal and of such shape that they clean, polish, smooth or round off the work articles, as desired. For some operations these abrasive objects can be omitted. In addition, liquids are generally used to help suspend particles that are removed from the work pieces, and keep them from becoming re-imbedded in the work pieces. The liquids are generally aqueous and contain dispersing agents with or without soaps, and burnishing ingredients may also be added. Emulsions or solutions can be used, and where descaling is to be carried out, the liquid can also contain ingredients such as acids that dissolve the scale. The selection of the particular combination of abrasive media and liquids is well known to those skilled in the art and forms no part of the present invention. Reference is made to Metal Handbook, 1948 edition, published by The American Society for Metals, Cleveland 3, Ohio, pages 301 to 305, as well as U.S. Patents 2,318,581 and 2,464,486, for additional details in this respect.

The container can be filled very close to the top, generally within three inches or so, and the vibration mechanism immediately started. This causes the container to gyrate with respect to its supports, and this in turn causes the individual solids in the container to be rubbed against each other and in addition also causes the entire contents of the container to circulate in more or less circular path around a center parallel to the vibrating shaft 18. For rough finishing operations, as well as those in which it is desired to markedly round off corners or edges, the air pressures in the respective air cushions can be adjusted so as to produce a large gyration amplitude, that is about ⅜ inch or more measured at the air cushions themselves. Changing the weight 521 on the eccentric shaft 18 provides even greater amplitude control.

Frequently control can be effected by changing the speed of the eccentric shaft 18, as by varying the drive ratio between the pulleys of the pulley drive 72. The pulleys can for instance have tapered belt-engaging surfaces with the respective surfaces movable with respect to the mating surface and mechanically controllable to give the pulleys variable diameters. By controlling the diameter of one pulley and having the halves of the second pulley spring-loaded, the second pulley will automatically undergo diameter changes that are induced by the belt tension changes caused by control changes in the first pulley, and the combined changes will give a new drive ratio. Both pulleys can also be directly controlled, if desired.

Figure 11:
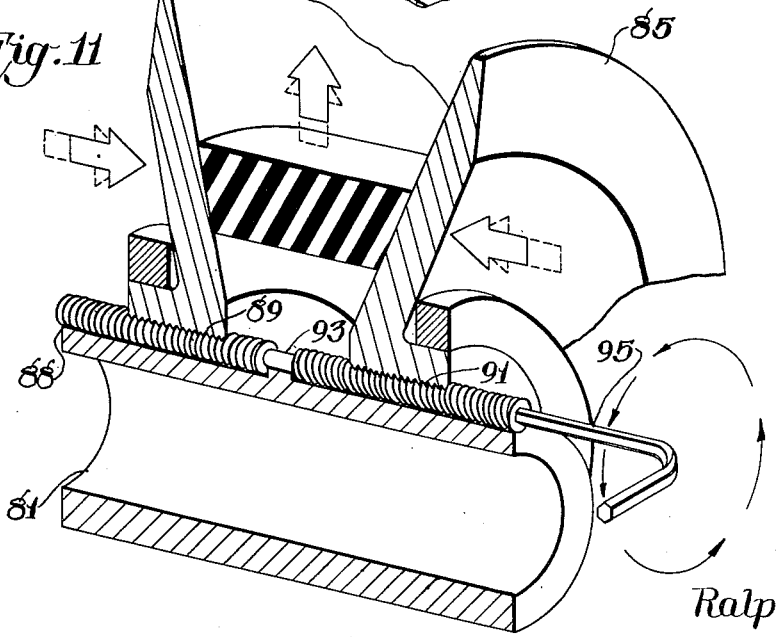

FIGS. 10 and 11 illustrate one form of speed control arrangement in accordance with the present invention. The motor 68 is here secured to a supporting panel 508 by bolts or studs 71 extending from the motor housing and passing through slots 73 in the plate. Nuts 75 and washers 77 clamp the bolts in place in any selected position along the slots. The shaft 79 of the motor is secured as by a keyed drive to a pulley hub 81 which in turn carries two separate pulley halves 83, 85 clamped in place as by split clamps 87. A groove 88 extending longitudinally of hub 81 on its outer surface mates with corresponding grooves 89, 91 in the respective pulley halves and together these grooves receive an adjusting screw 93. The threads of this screw are divided longitudinally into two longitudinal portions and is left-hand in one portion, right-hand in the other. The grooves in the respective pulley halves are similarly threaded, the groove 87 being unthreaded. Rotation of the screw, as by the Allen wrench 95, causes the pulley halves to move toward or away from each other, depending on the direction of screw rotation. The clamps 83, 85 should be loosened to enable such motion of the pulley halves, and can then be tightened as by screws 97 extending through one end of each split ring and threaded into the opposite end. Adjustment of the pulley halves causes the belt, which has a fixed width, to fit in a correspondingly shifted portion of the tapered drive faces of the pulley halves thereby effectively changing the diameter of the motor pulley.

The cooperating pulley can be non-adjustable in which event all drive adjustments are accompanied by resetting of the position of the motor 68 along the grooves 73, or the cooperating pulley can be of the split spring-loaded type referred to above in which event all adjustments in the motor pulley cause correlative spreading or narrowing of the driven pulley without any change in motor position.

Instead of having the pulley adjustment made only when the machine is stopped, a standard type of rotating pulley adjustment device can be used. For example, the drive pulley can have one of its halves equipped with a collar freely rotatable around the pulley hub and engaged with a manually adjustable slider fork connected to be adjusted while the pulley is rotating as well as while it is stopped. The other half of the drive pulley can be fixed in position, and the driven pulley can have a corresponding fixed half cooperating with a spring-loaded half to keep the belt center aligned on both pulleys.

Speed changes in the vibrating frequency at which the apparatus is driven are also easily made by merely using a standard induction type A.C. winding arrangement in the drive motor, and supplying the motor with electrical power at a variable frequency. Thus a 60 cycle power supply to such a motor can drive it at 1800 r.p.m., whereas 50 cycle power will drive it at ⅚ of 1800 or 1500 r.p.m. A generator having a controllable output frequency can then be used to change the vibrating frequency without any mechanical change in the vibratory apparatus itself.

The cushions used in the construction of FIGS. 1 and 2, when supplied in pairs above and below the container table, need not have the individual cushions of each pair directly opposed. These cushions can be offset, if desired, and this offsetting is helpful in simplifying the mounting of the cushions. The additional air cushions used for supporting the base of the apparatus can be identical with the cushions illustrated in the figures, or they can be different in size and/or shape. The cushions used to support the table, or the container where a table is omitted, can also be varied in size and shape and where pairs of cushions are used in the individual cushions of each pair need not be identical. FIG. 6 shows an offset pair of table-supporting air cushions 40, 42 each of different size, in the general arrangement of the construction of FIGS. 1 and 2.

FIGS. 3 and 4 show a useful modification of the supporting elements in which valved air cushions 40A and 40B are employed in supporting position below table 520A and 520B. Coil springs 100A and 100B are mounted in preloading position above the table, and held in place by a nipple 102A and 102B respectively, attached by a bolt to brackets 545A and 545B attached to side sheet 504.

In FIG. 4 is shown a suitable offset arrangement for the coil spring 100B and air cushion 40B.

FIG. 5 shows another modification of the supporting element in which valved air cushion 40C acts as a preloading device above coil spring 100C. A compression screw 108C initially adjusts the level of the table 520C.

FIG. 5a has a vibratory container 500D supported on a table 520D in a manner similar to that of FIG. 4, using a set of air cushions 40D and offset coil springs 100D above them. The ends of coil spring 100D are here secured to their supports by forming the supports with threaded engagement surfaces 110D in which about three or more turns of each coil end is threaded. This type of anchorage helps prevent chattering of the coil springs when the container is vibrated at some speeds, usually those well above the natural vibration frequency of the coil springs themselves.

FIG. 5a also includes an amplitude-limiting arrangement for the container and table. A bar 530D fastened to the table or container is arranged to project out through an aperture 532D in an angled member 532D' secured to the framework 531 or in a reinforced section thereof. The aperture 532D can provide a space all around the bar sufficient to permit the bar to vibrate with the table through the usual range of vibratory amplitudes. Generally a ½ inch clearance is sufficient. This will also minimize the possibility of damage to the air cushions in the event the pressure within them is suddenly released, for example should there be failure of the air pump or inadvertent opening of a vent valve. When this happens the small clearance of opening 532D will keep the air cushion from complete collapse. The bar 530D should be made sufficiently strong for the above purpose as by cutting it from a ½ inch thick steel plate. Also to keep the bar from pivoting on its mount it can be fixed in place by more than one bolt. It can, for example, be in the shape of a T with both arms of the T secured by spaced bolts and the leg of the T extending through the aperture 532D. The position of the bar in the aperture also makes a suitable height indicator for the container. Furthermore it can be so co-related with the alignment of the flexible drive connection where one is used as at 82 in FIG. 1 that a misalignment will cause the rod 530D to hammer against the margin of aperture 532D when the work is being vibrated. This gives an audible warning of misalignment, and such a warning is not easily ignored.

It is preferred that the cushions be protected from mechanical damage as by mounting them internally of the outer walls of the machine, according to the above instructions for example. The vibrating apparatus of the present invention preferably has its base supported on a floor by additional air cushions. Such base cushions need not have their pressures readily adjustable, and they can be protected by surrounding the individual cushions with a pair of loosely inter-fitting sleeves, the inner one secured to the ground contact or floor plate, and the outer one secured to the machine base. Each sleeve should have its unsecured end spaced from the opposed portion of the base mounting so as to permit a small amount of motion between the base and the machine mounting plate. Also the outer sleeve can have its upper or secured end completely covered so as to be waterproof and thereby act as an umbrella to protect the cushion. The amount of movement permitted by the sleeves is very desirably arranged so that the sleeves reach the limit of their collapsed travel and firmly engage their opposing members to thereby support the entire apparatus, before the air cushion is completely deflated. This is helpful particularly for shipping and erection purposes, and minimizes the possibility of damaging the air cushion. A further improvement is to supply a resilient bumper on the unsecured end of one of the sleeves, preferably the inner sleeve, so as to reduce the shock that might accompany rapid deflation. The same bumper can also extend laterally to further absorb lateral deflection shocks. The unsecured end of the outer sleeve can be provided with a travel clearance somewhat greater than that of the inner sleeve so as to keep the outer sleeve from engaging its collapsed stop and thereby avoid any pinching action.

FIG. 7 shows such a base support in which an air cushion 301 is fitted between the floor 303 and the bottom of pier 54, and is surrounded by an inner sleeve 305 standing up from the floor. The top if the inner sleeve carries a rubber bumper strip 307 and the sleeve itself is surrounded by an outer sleeve 309 depending from the bottom of the pier.

The work containers in accordance with the present invention can be used in uncovered condition as illustrated, or they can be provided with covers as for example to maintain a desired atmosphere in the work container or for the purpose of assisting with screening operations or rinsing operations. One very desirable form of cover has a tapered mounted clip along one edge for engaging an edge of the container, which edge may be flanged as also illustrated in FIGS. 1 and 2. The opposite edge of the cover can be provided with one or more toggle clamps or the like which can be secured to the cover and clamped against the edge of the container. The taper of the cover mounting clip is arranged so as to cam the cover against the open face of the container when the cover is slipped into position, and before the clamp is set.

Perforated covers when used for rinsing can be fitted over the container at the end of the vibration treatment or when the treatment goes from one stage to another and the liquid contents are to be replaced or removed. Perforated covers can be made of sheet material or of screening, held in a suitable framework and with the openings or screening of any desired mesh. FIGS. 8 and 9 show covers 411 of this type in which there is provided a screened passageway 413 as well as a hose connection 415 for filling or washing. This connection is desirably of the quick disconnect type that cooperates with the well-known quick disconnect hose fittings which seal the hose end but which automatically open the hose end when the fitting is mounted over the hose connection 415. A tapered mounting clip 417 is formed at one edge of the cover 411, and under the cover a fine screen 419 can be slipped as shown in FIG. 9, when the screen in the cover itself is too coarse for a desired screening operation. Toggle clamps 421 or other suitable fasteners can be used to lock the cover in place with or without the fine screen.

A fairly coarse mesh is suitable for general use and will keep work articles as well as most media particles from spilling out of the container when it is tilted for example. Finer meshes are sometimes needed for use with extremely small work pieces or small particles of gyrating media, and such fine screens can either be provided with their own frames or can be inserted under a coarser screen. The tapered clip arrangement permits the lifting of the main screen, the insertion of an auxiliary screen underneath, and the re-locking of the cover without detracting from the cover fastening's security.

Where the vibrating drive uses a motor separately mounted on the support that carries the container and its table, the pancake type of motor construction is an unusually effective one, particularly when the pancake motor has a mounting flange along one face of the pancake. The motor can then be mounted in place by bolts or the like extended through bolt receiving apertures in the motor flange as well as in the wall to which the motor is mounted. The bolt receiving apertures in the wall can be elongated so as to be in the shape of slots and thereby allow adjustment of the motor position, or the slots can be in the motor flange for the same purpose. A feature of this construction is that the motor can be very simply adjusted by tilting the apparatus and permitting the motor to move under the influence of its own weight. Thus by simply loosening the motor fastening bolts when the apparatus is tilted toward the unloading position, the motor can be held in place by its drive belt, so that the proper belt tension is obtained, after which the mounting bolts are again clamped in place to secure the drive. To change adjustments the apparatus with the motor bolts loosened is tilted toward operating position so as to permit the motor to slide down its mounting slots and loosen its belt. The belt can then be replaced if desired. Either or both of the belt pulleys can be adjusted when the belt is loosened.

The moving of work articles along the vibrating container as for continuous flow treatment, is affected by the relationship of the eccentric shaft 18 with the longitudinal axis of the container. If the shaft is not exactly parallel to that axis, the vibration causes the container contents to move toward the container portions having the greater amplitude of vibration. As little as 1 degree of angularity or skew will give a perceptible longitudinal or flow motion, and sometimes normal variations in manufacturing of the structural components have to be compensated for to avoid such motion. A skew of 2 or 3 degrees is very helpful in bringing about rapid flow motion, and this can be used to help discharge the container contents from one of its longitudinal ends. This action should be avoided with batch type operation where it has the effect of segregating the work pieces as well as of the media, in longitudinally localized strata.

The flow through the container can be arranged to take place without tilting the continuous-flow container, by utilizing the above skew action. Furthermore, or in place of skew action, the work flow will result from the mere loading of the container. As loading takes place, the contents of the container tend to overflow inasmuch as they are in a fluent condition, and the provision of a low spot at a desired location of the container rim will establish overflow there. The faster the loading, the faster the overflow thus caused. The skew action can be used to assist or retard the effect of the loading.

Another feature of the present invention is that the air cushion supports lend themselves admirably to vibration or gyration at frequencies different from the natural vibrating or gyrating frequency of the assembly. In fact, the vibratory finishing action is generally speeded up when the frequency is brought to about 1500 cycles per minute and most machines will have natural frequencies of the order of 900 or fewer cycles per minute.

The air cushions in the floor mounts sharply reduce the amount of vibration that is transmitted to the floor and are also suitable for leveling devices. By selecting suitable pressures for the individual air cushions, non-level floor conditions can be readily compensated for. With floor mount air cushions, the work pieces seem to undergo better treatment.

It should be noted that the vibration described above is of a gyratory or circular nature, and not a simple to-and-fro motion. Because of the manner in which the vibrating table and container are supported, they undergo rotary vibrations with different portions of the container as well as its contents moving through different rotary paths. This gyration gives better finishing as compared to simple to-and-fro linear vibration.

Another air cushion support for the apparatus of the present invention is illustrated in FIG. 12. In this construction the dual tube arrangement of FIG. 7 is used along with a clamping device to secure the components in place while the apparatus is being shipped from one location to another. For this purpose a set of spaced lugs 311 is secured as by welding to the outer tube and studs 313 extend through apertures in the lugs and threadedly engage a plate 315 to which the lower tube is fastened. If desired, this threaded engagement can be with nuts 317 welded to the top of the plate. Removable nuts 319 on the studs can then be threaded on the studs and engaged against the upper faces of the lugs to effectively clamp the upper tube to the lower tube. In clamped condition the apparatus can be crated and shipped without fear that the base air cushions will become disengaged from their mountings.

FIG. 12 also includes a resilient pad 321 under the bottom plate 315 of the base. This pad which is conveniently a rubber sheet, makes up for minor irregularities in the floor 322 upon which the base rests and provides much better vibration with less transmission of the vibrations to the floor. The pad need only be a ⅜ inch thick slab of tough rubber such as is used in automobile tire tread, preferably with waffled or dimpled faces. If desired, thicker rubber slabs can be used, and the rubber can be natural rubber or any synthetic rubber such as butadiene-styrene rubber, butyl rubber, neoprene or the like. The pad 321 can have one or more perforations aligned with corresponding perforations in base plate 315 so that a wire or the like can be threaded through the perforations to hold the pads in place during shipment of the apparatus. Alternatively, the pads can be cemented in place.

To keep from damaging the pads or the floor, the fasteners used to hold the air cushion 301 in the supports of FIGS. 7 or 12 to the base plate should not project out below the lower surface of the base plate. Flat head or other suitable flush-fitted or countersunk screws 324 can be used for this purpose, and can be threaded into blind nuts fitted within the air cushion.

While the container and its associated members such as the table on which it is supported, can be effectively gyrated with only a set of four air cushions supporting it, the use of opposed resilient forces such as the abovementioned pre-loading, helps to secure the desired vibration. Furthermore, the advantages contributed by the air cushions in simplifying the adjustment of the container height so that the drive coupling shows least wear, is a feature that makes it more desirable to have the air cushions effectively below the container rather than effectively above the container, when the pre-loading is in the form of coil springs, as in FIGS. 3 and 4, or other types of mechanical springs. Such pre-loading applied in a downward direction against the air cushions, as in FIGS. 3 and 4, can be made non-adjustable whereas by reversing the position of the air cushion and the spring, as in FIG. 5, it is better to have an adjustment for the spring as indicated, to give good control over the container height.

The table on which the container is supported can take other forms and can in fact be made integral with the container if it is not desired to have the container readily separated, as for example when the container is to be removed for relining.

Obviously many modifications and variations of the present invention are possible in the light of the above teachings. It is, therefore, to be understood that within the scope of the appended claims the invention may be practiced otherwise than as specifically described.

What is claimed:

1. An apparatus for subjecting work articles to vibratory finishing treatment, said apparatus having a supporting base, a framework journaled to said base, a work container resiliently supported from said framework and adapted for gyratory movement, said framework enclosing the sides of the apparatus, and an apron covering the top of the apparatus around the container, the container having a top edge flange, and the apron having an upwardly directed lip positioned adjacent and under the flange to keep materials from dropping into the interior of the apparatus.

2. A device according to claim 1 in which the lip carries a height indicator means that cooperates with the container's exterior to show the vertical position of the container.

3. An apparatus for subjecting work articles to vibratory finishing treatment, said apparatus having a supporting base, a framework journaled to said base, a table, lower resilient means supported by said framework which supports said table, upper resilient means mounted upon said framework and depressed against the top of said table to in turn depress said table against said lower resilient means, a work article container mounted on said table, gyratory means rotatably suspended from said table for imparting gyratory movement to said table and said mounted container, and a driving motor mounted within said framework and connected with said gyratory means whereby said table and container are gyrated the lower resilient means being air cushions, and the upper resilient means being a mechanical spring.

References Cited in the file of this patent

UNITED STATES PATENTS

| | | |
|---|---|---|
| 2,115,072 | Hunt et al | Apr. 26, 1938 |
| 2,819,046 | Jandris et al. | Jan. 7, 1958 |
| 2,973,606 | Brandt | Mar. 7, 1961 |
| 2,993,585 | Musschoot | July 25, 1961 |
| 2,997,814 | Brandt | Aug. 29, 1961 |
| 3,063,207 | Moore | Nov. 13, 1962 |